United States Patent
Glain et al.

(10) Patent No.: US 10,988,055 B2
(45) Date of Patent: Apr. 27, 2021

(54) PASSENGER SEAT WITH MOVABLE BACKREST PORTION

(71) Applicant: Safran Seats USA LLC, Gainesville, TX (US)

(72) Inventors: Arthur K. Glain, Huntington Beach, CA (US); Victor Carlioz, Newport Beach, CA (US)

(73) Assignee: Safran Seats USA LLC, Gainesville, TX (US)

(*) Notice: Subject to any disclaimer, the term of this patent is extended or adjusted under 35 U.S.C. 154(b) by 0 days.

(21) Appl. No.: 16/490,457

(22) PCT Filed: Nov. 17, 2017

(86) PCT No.: PCT/US2017/062177
§ 371 (c)(1),
(2) Date: Aug. 30, 2019

(87) PCT Pub. No.: WO2018/169575
PCT Pub. Date: Sep. 20, 2018

(65) Prior Publication Data
US 2020/0070691 A1 Mar. 5, 2020

Related U.S. Application Data

(60) Provisional application No. 62/472,849, filed on Mar. 17, 2017.

(51) Int. Cl.
*B60N 2/32* (2006.01)
*B60N 2/64* (2006.01)
(Continued)

(52) U.S. Cl.
CPC ............ *B60N 2/22* (2013.01); *B60N 2/66* (2013.01); *B60N 2/809* (2018.02); *B60N 2/885* (2018.02);
(Continued)

(58) Field of Classification Search
CPC ... B60N 2/22; B60N 2/66; B60N 2/75; B60N 2/885; B60N 2002/2204; B60N 2205/35
(Continued)

(56) References Cited

U.S. PATENT DOCUMENTS 1,968,232 A * 7/1934 Thomas ................ B60N 2/646
297/353 X
3,880,463 A * 4/1975 Shephard ........... B64D 11/0691
297/284.7
(Continued)

FOREIGN PATENT DOCUMENTS

| EP | 1951571 | 8/2008 |
|---|---|---|
| EP | 2785589 | 10/2014 |

(Continued)

OTHER PUBLICATIONS

International Patent Application No. PCT/US2017/062177, Search Report and Written Opinion, dated Feb. 28, 2018.

*Primary Examiner* — Rodney B White
(74) *Attorney, Agent, or Firm* — Kilpatrick Townsend & Stockton LLP (57) ABSTRACT

A passenger seat having improved backrest comfort features. The passenger seat has a backrest with a movable portion. In one example, the movable portion is defined by an upper backrest portion that can slide up and away from a lower backrest portion to provide a gap between the two portions. The gap 5 may provide an arm or elbow rest for a seat occupant. The movability of the backrest can also provide enhanced comfort for the seat occupant by allowing adjustability of the head rest portion. In other examples, the movable portion comprises the entire backrest of the seat. When in a raised position, the backrest may also provide enhanced privacy to the seat occupant.

7 Claims, 8 Drawing Sheets

(51) Int. Cl.
   *B60N 2/22* (2006.01)
   *B60N 2/809* (2018.01)
   *B60N 2/885* (2018.01)
   *B60N 2/66* (2006.01)
   *B60N 2/75* (2018.01)

(52) U.S. Cl.
   CPC ........ *B60N 2/75* (2018.02); *B60N 2002/2204* (2013.01); *B60N 2205/35* (2013.01)

(58) Field of Classification Search
   USPC .......... 297/118, 284.3, 284.7, 341, 342, 343, 297/353, 354.13
   See application file for complete search history.

(56) References Cited

U.S. PATENT DOCUMENTS

| | | | | |
|---|---|---|---|---|
| 5,628,547 A * | 5/1997 | Matsumiya | ............ | B60N 2/242 |
| | | | | 297/342 X |
| 5,836,647 A * | 11/1998 | Turman | ............... | B60N 2/4228 |
| | | | | 297/353 X |
| 5,836,651 A * | 11/1998 | Szerdahelyi | ......... | B60N 2/2222 |
| | | | | 297/353 X |
| 5,857,745 A * | 1/1999 | Matsumiya | ............. | B60N 2/34 |
| | | | | 297/354.13 |
| 5,954,401 A * | 9/1999 | Koch | .................... | B60N 2/242 |
| | | | | 297/354.13 X |
| 5,992,798 A * | 11/1999 | Ferry | .................... | A47C 1/0352 |
| | | | | 297/354.13 X |
| 6,059,364 A * | 5/2000 | Dryburgh | ............ | A47C 1/0352 |
| | | | | 297/354.13 |
| 6,170,786 B1 * | 1/2001 | Park | .................... | B64D 11/0638 |
| | | | | 248/274.1 |
| 6,352,309 B1 * | 3/2002 | Beroth | ................... | B64D 11/06 |
| | | | | 297/354.13 |
| 6,412,870 B1 * | 7/2002 | Higgins | ................... | B60N 2/34 |
| | | | | 297/342 |
| 6,692,069 B2 * | 2/2004 | Beroth | ............... | B64D 11/0644 |
| | | | | 297/118 |
| 7,108,326 B2 * | 9/2006 | Schurg | ............... | B64D 11/0638 |
| | | | | 297/342 X |
| 7,134,729 B2 * | 11/2006 | Dowty | ................... | B64D 11/06 |
| | | | | 297/343 X |
| 7,178,871 B1 * | 2/2007 | Round | ............... | B64D 11/0601 |
| | | | | 297/354.13 X |
| 7,318,622 B2 * | 1/2008 | Rezag | ................ | B64D 11/0604 |
| | | | | 297/118 |
| 7,472,957 B2 * | 1/2009 | Ferry | .................... | B60N 2/206 |
| | | | | 297/343 |
| 7,517,010 B2 * | 4/2009 | Saint-Jaimes | ...... | B64D 11/0641 |
| | | | | 297/118 |
| 7,523,888 B2 * | 4/2009 | Ferry | .................... | B60N 2/206 |
| | | | | 297/354.13 X |
| 7,543,888 B2 * | 6/2009 | Kuno | .................... | B60N 2/0232 |
| | | | | 297/353 |
| 7,547,068 B2 * | 6/2009 | Davis | .................... | B60N 2/2222 |
| | | | | 297/353 |
| 7,686,394 B2 * | 3/2010 | Nishikawa | ........... | B60N 2/2222 |
| | | | | 297/284.3 |
| 7,828,387 B2 * | 11/2010 | Yoshizawa | ............. | B60N 2/835 |
| | | | | 297/391 |
| 7,837,259 B2 * | 11/2010 | Staab | .................... | B64D 11/064 |
| | | | | 297/118 X |
| 8,348,339 B2 * | 1/2013 | Onuma | ................. | B60N 2/0232 |
| | | | | 297/284.3 |
| 8,414,076 B2 * | 4/2013 | Plant | .................... | B64D 11/0641 |
| | | | | 297/354.13 |
| 8,419,123 B2 * | 4/2013 | Hankinson | ............. | B64D 11/06 |
| | | | | 297/342 X |
| 8,579,375 B2 * | 11/2013 | Marais | ............... | B64D 11/0641 |
| | | | | 297/342 |
| 8,616,643 B2 * | 12/2013 | Darbyshire | ........ | B64D 11/0604 |
| | | | | 297/342 |
| 8,876,202 B2 * | 11/2014 | Olliges | ............... | B64D 11/0604 |
| | | | | 297/341 X |
| 8,894,142 B2 * | 11/2014 | Alexander | ............. | B60N 2/876 |
| | | | | 297/410 X |
| 8,936,214 B2 * | 1/2015 | Foucher | ................... | B60N 2/34 |
| | | | | 244/118.6 |
| 9,004,599 B2 * | 4/2015 | Collins | ............... | B64D 11/0601 |
| | | | | 297/354.13 |
| 9,102,255 B2 * | 8/2015 | Duckert | .................... | B64D 11/06 |
| 9,944,396 B2 * | 4/2018 | Udriste | ............... | B64D 11/0646 |
| 10,245,986 B2 * | 4/2019 | Akaike | .................... | B60N 2/68 |
| 10,266,271 B2 * | 4/2019 | Udriste | .................... | B60N 2/995 |
| 10,717,534 B2 * | 7/2020 | Duckert | ............ | B64D 11/0642 |
| 2001/0000639 A1 | 5/2001 | Park et al. | | |
| 2003/0085597 A1 * | 5/2003 | Ludeke | ............... | B64D 11/0644 |
| | | | | 297/354.13 X |
| 2004/0036336 A1 * | 2/2004 | Veneruso | ........... | B64D 11/0641 |
| | | | | 297/354.13 |
| 2006/0186719 A1 * | 8/2006 | Davis | .................... | B60N 2/2222 |
| | | | | 297/353 |
| 2007/0040434 A1 * | 2/2007 | Plant | .................... | B64D 11/0643 |
| | | | | 297/354.13 |
| 2007/0262625 A1 | 11/2007 | Dryburgh et al. | | |
| 2014/0110981 A1 | 4/2014 | Hasegawa et al. | | |
| 2014/0210235 A1 * | 7/2014 | Ferry | ................. | B64D 11/0696 |
| | | | | 297/118 |
| 2015/0028634 A1 * | 1/2015 | Scherello | ........... | B61D 33/0014 |
| | | | | 297/163 |
| 2020/0010199 A1 * | 1/2020 | Ferguson | ........... | B64D 11/0642 |

FOREIGN PATENT DOCUMENTS

| | | |
|---|---|---|
| EP | 3129289 | 2/2017 |
| WO | 2011068684 | 6/2011 |
| WO | 2014064525 | 5/2014 |
| WO | 2015104527 | 7/2015 |
| WO | 2015155687 | 10/2015 |
| WO | 2018151779 | 8/2018 |

* cited by examiner

PASSENGER SEAT WITH MOVABLE BACKREST PORTION

CROSS REFERENCE TO RELATED APPLICATIONS

This application is related to and claims priority benefits from U.S. Provisional Application Ser. No. 62/472,849, filed on Mar. 17, 2017, entitled "Business Class Seat Comfort Features," the entire contents of which are hereby incorporated by this reference.

FIELD OF THE INVENTION

The field of this disclosure relates to passenger seats having improved comfort layouts and incorporating a movable backrest. Specific embodiments find particular use on-board passenger transportation vehicles, where a balance between comfort, space, and weight are desirably optimized.

BACKGROUND

Many vehicles such as passenger aircraft, buses, trains, ships, automobiles, and the like include seats for bearing passengers en route to a destination. The seats are designed with frames for supporting cushions, pads, and other seating components. A number of factors affect suitability of such passenger seats. For example, vehicle passenger seats are subject to safety requirements established by governments or other standard-setting organizations. Passenger comfort is also an important consideration in seat design. It is also desirable to reduce the seat's weight (e.g., which may directly affect an amount of fuel and corresponding cost to bear the seat between destinations) and general costs associated with a seat (e.g., cost of production, cost of installation, or cost of maintenance) in order to reduce overall operating costs. Airlines or other passenger aircraft operators may specify that seats for a particular aircraft or particular class level be of a particular size (e.g., have a specific maximum width or other dimension or fit within a specific footprint or area).

In many instances, passenger seats may be provided with various personal electronic and entertainment options to encourage passengers to remain seated as much as possible. This can help ensure passenger safety during transport, crew mobility, and to efficient cabin service. Some passenger seats provide video and audio entertainment, including television, video games, internet access, and other in-flight entertainment ("IFE") components. Typically, these entertainment devices are mounted in the seat backs and/or arm rests of the passenger seats.

Passenger seats also may allow for recline or other relaxing positions. For example, most aircraft seats are provided with an upright position (often referred to as a taxi, take-off and landing ("TTL") position), but that allow at least some amount of recline during travel. Some seats that are designed for extended flights have bed positions that allow the seats to fully recline or otherwise be extended to a flat (or close to flat) bed-like configuration.

Although the backrest may move/recline with respect to the seat pan, in most instances, the backrest portion of passenger seats is a single, one-piece, integral backrest portion that, itself, is not movable other than to recline with respect to the seat pan. Improvements to backrest comfort are desired.

SUMMARY

Accordingly, the present inventors have designed a passenger seat having improved backrest comfort features. The passenger seat disclosed herein is designed to provide a backrest with a movable portion. In one example, the movable portion is defined by an upper backrest portion that can slide up and away from a lower backrest portion to provide a gap between the two portions. The gap may provide an arm or elbow rest for a seat occupant. The movability of the backrest can also provide enhanced comfort for the seat occupant by allowing adjustability of the head rest portion. In other examples, the movable portion comprises the entire backrest of the seat. When in a raised position, the backrest may also provide enhanced privacy to the seat occupant. Further features are described herein.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of this disclosure, there may be provided a passenger seat backrest, comprising: a passenger seat privacy shell defining a seat portion and a backrest portion, the back rest portion comprising a movable portion configured to translate with respect to the privacy shell, wherein in a lowered position, the backrest is flush with or lower than the privacy shell and wherein in a raised position, the backrest extends above the privacy shell. The backrest portion may have a lower portion and an upper portion, the lower portion configured to remain stationary, and the upper portion configured to translate with respect to the lower portion to create a space therebetween, wherein in a lowered position, the upper portion is flush with or lower than the privacy shell and wherein in a raised position, the upper portion extends above the privacy shell. The lower portion may feature a lumbar cushion with side arms extending therefrom at curved side angles. The upper portion may feature a head/neck cushion with side arms extending therefrom at curved side angles.

DETAILED DESCRIPTION

The described embodiments provide improved passenger seats having improved backrest comfort features. While the improved comfort features are described in connection with aircraft seats, they are by no means so limited. Rather, the embodiments disclosed may be used in passenger seats or other seats of any type or otherwise as desired.

According to certain embodiments illustrated by FIGS. 1-9, the disclosed passenger seat 10 has a seat portion 12 and a movable backrest portion 14. In certain examples, the seat portion 12 may be a traditional seat pan. The backrest portion 14 may hingedly move to recline with respect to the seat portion 12 via one or more actuators, in traditional aircraft seat fashion. In other examples, the seat portion 12 and backrest portion 14 may collectively be defined within or by a seat shell 16. The passenger seat support (e.g., the seat and the backrest portions 12/14) is defined by the seat shell 16 itself. The passenger is sitting on the seat shell 16 (albeit upon intervening cushions), rather than providing a metal seat unit that requires a completely separate seat shell. This can help reduce weight and complexity of the seat. This embodiment does not require seat actuators for recline, but instead provide a couch-like feel. Examples of this embodiment are shown and described by concurrently-filed application titled "Passenger Seat with Comfort Layout," PCT Application Number PCT/US2017/062142, the entire contents of which are incorporated herein by reference.

Regardless of which seat configuration is used, the movable backrest portions 14, 60 described herein may be used. In one example, the backrest portion may be generally provided as being fairly wide, as compared to other passenger seat backs. The backrest portion may also be provided as having a rounded or curved-like configuration that encloses the passenger for privacy, as well as comfort.

As shown by FIGS. 1-5, one embodiment of the movable backrest portion 14 is illustrated as having two separate portions. In use, a first lower portion 18 provides a lumbar support for the seat occupant. A second upper portion 20 provides an upper back and/or head rest for the seat occupant. The first lower portion 18 remains in a stable, stationary position. The second upper portion 20 is configured to move with respect to the first lower portion 18. In one example, the second upper portion 20 translates away from the first lower portion 18. This translation may be along arrow 22. The translational movement is generally along the same plane in which the first lower portion 18 and second upper portion 20 lie. The translational movement may be an upwardly raised motion that raises the second upper portion 20 away from the first lower portion 18. The translational movement is generally with respect to the seat shell 16.

The raised configuration creates a space 24 between the first lower portion 18 and the second upper portion 20. An upper surface 26 of the lower portion 18 may be used as an arm rest or an elbow rest. The space 24 formed between the upper portion 20 and the lower portion 18 provides an area for a passenger's arm and/or elbow to be received between the portions 18, 20. The raised configuration may also provide the seat occupant with enhanced privacy, with the raised upper portion 20 functioning as a privacy screen.

Figure 1:
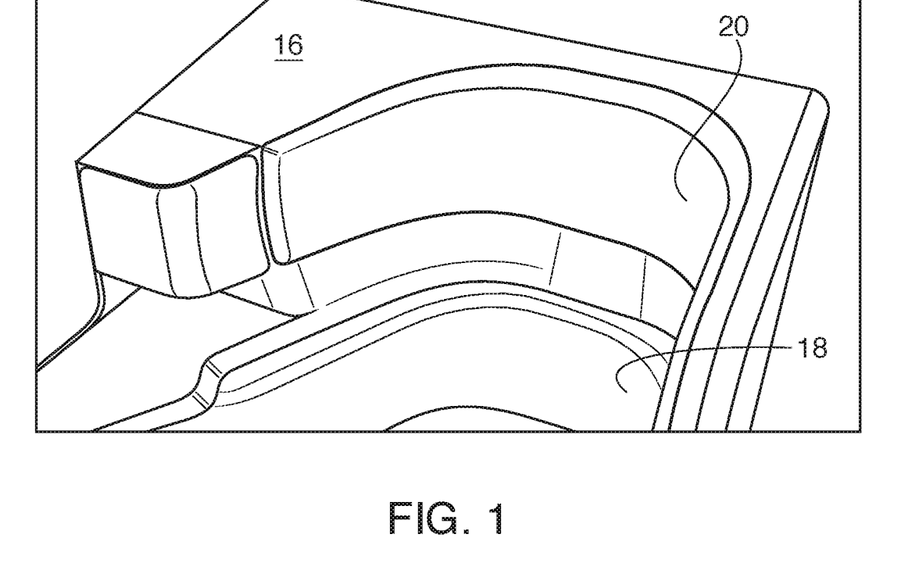
FIG. 1 is a front perspective view of a passenger seat according to certain embodiments of this disclosure.
Figure 2:
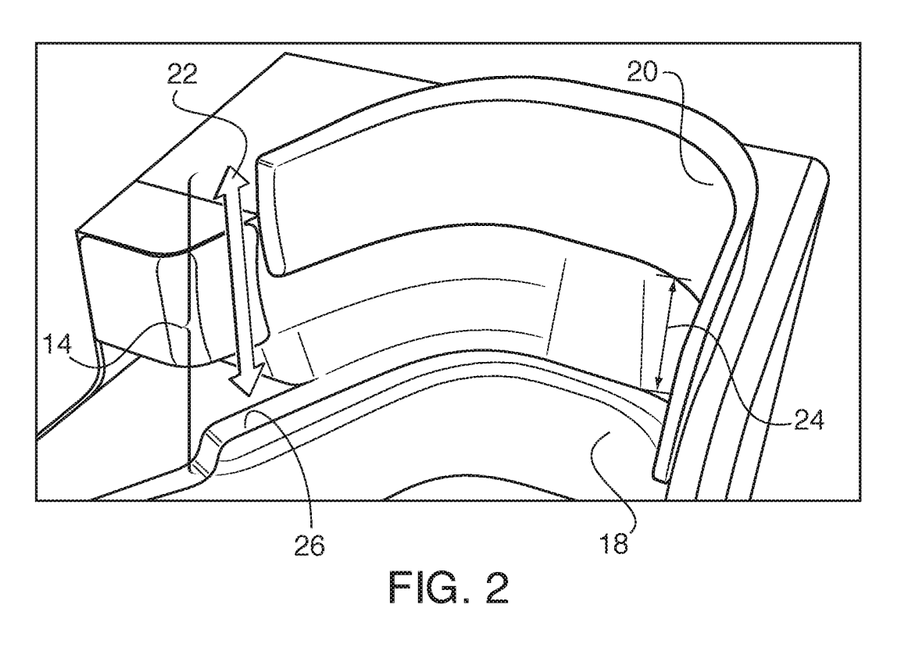
FIG. 2 is a front perspective view of the passenger seat of FIG. 1, with an upper portion of the backrest in a raised position.
Figure 3:
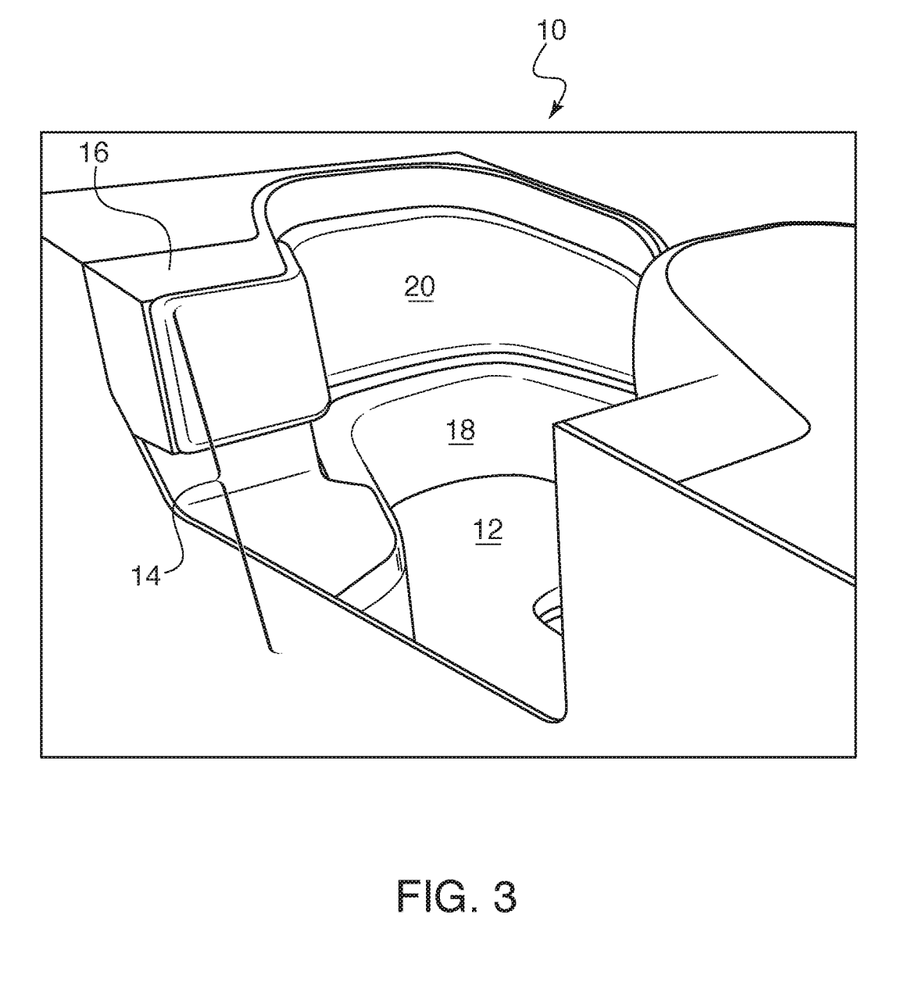
FIG. 3 is a front perspective view of an alternate passenger seat configuration.
Figure 4:
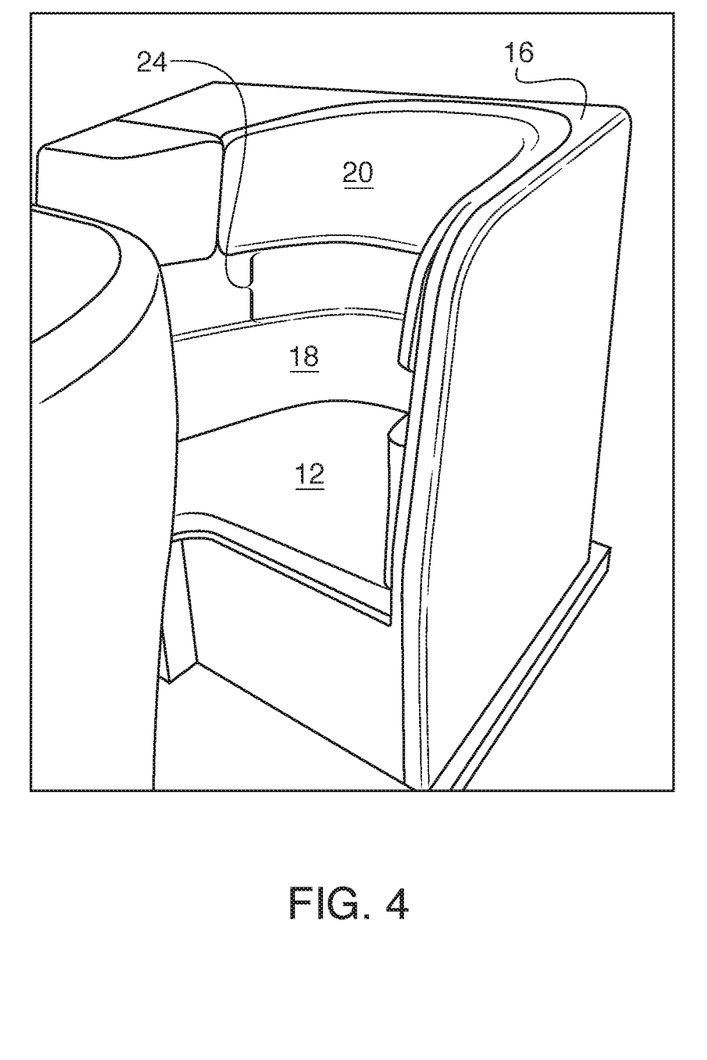
FIG. 4 is a front perspective view of the passenger seat of FIG. 3, defining a space between the lower portion and the upper portion of the backrest.
Figure 5:
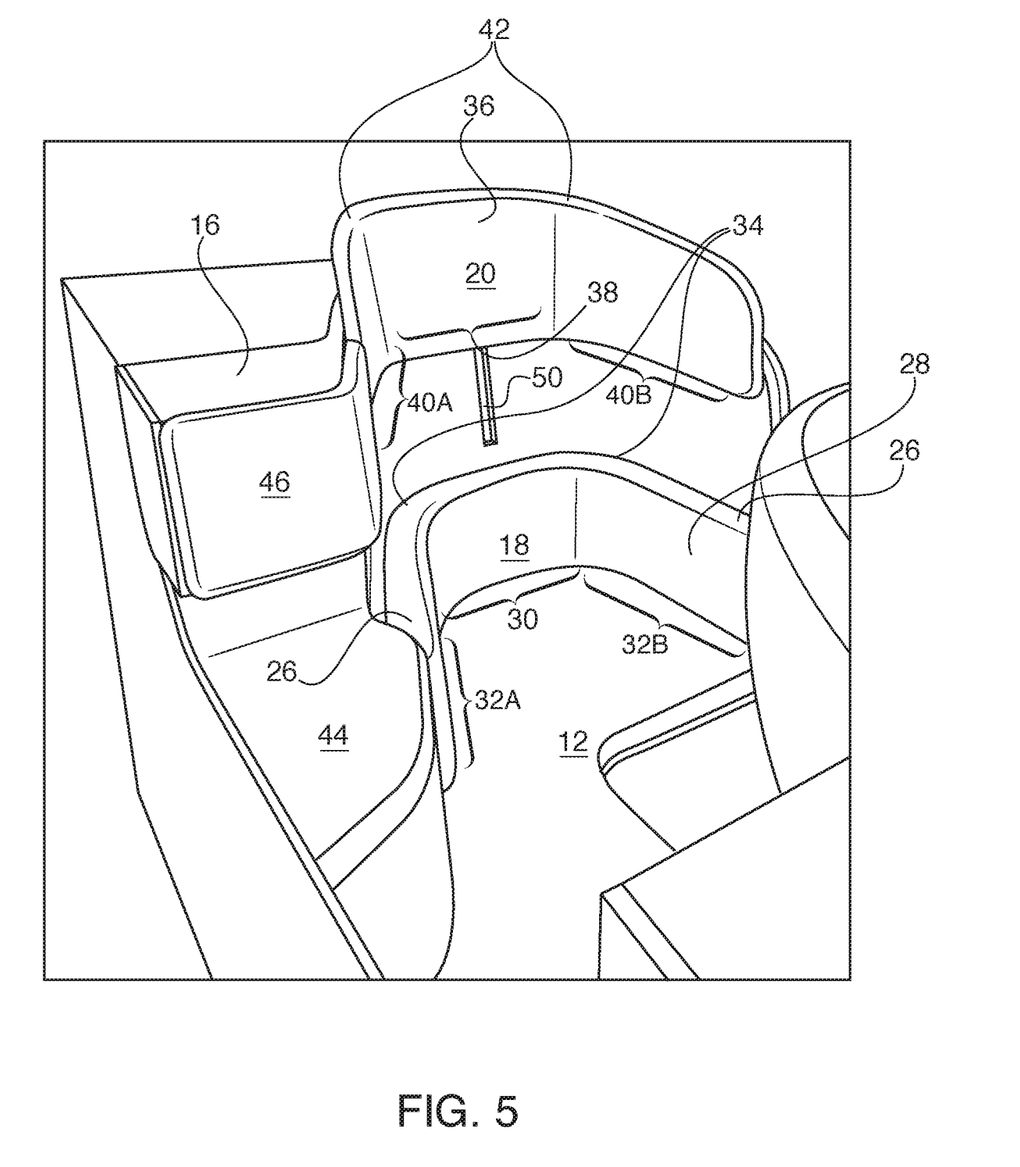
FIG. 5 is a front perspective view of the passenger seat of FIG. 3, with the upper portion of the backrest in a raised position.

As illustrated by FIGS. 3-5, the first lower portion 18 may be formed as a generally curved one-piece configuration 28. The one-piece configuration 28 may be defined by lumbar cushion 30 with extending sides 32A and 32B. The one-piece configuration 28 has curved side angles 34 at which the sides 32A and 32B extend from the lumbar cushion 30. This configuration allows a seat occupant to feel bounded by the sides 32A and 32B, while still being provided with movable space within the envelope of the passenger seat 10. The upper surfaces 26 of sides 32A and 32B may form armrest surface(s) when the second upper portion 20 is raised.

The second upper portion 20 may be formed as a generally curved one-piece configuration 36. The one-piece configuration 36 may be defined by head/neck cushion 38 with extending sides 40A and 40B. The one-piece configuration 36 has curved side angles 42 at which the sides 40A and 40B extend from the head/neck cushion 38. In the embodiment shown, one of the sides 40B may define a longer extension than the other side 40A. The longer side 40B extension may form an aisle-side of the passenger seat 10. The shorter side 40A may form a console-side of the passenger seat 10. The console-side may be defined by a side console 44 and a storage feature 46. Having a shorter side 40A of the one-piece configuration 36 may provide space for these additional passenger seat features.

Figure 6A:
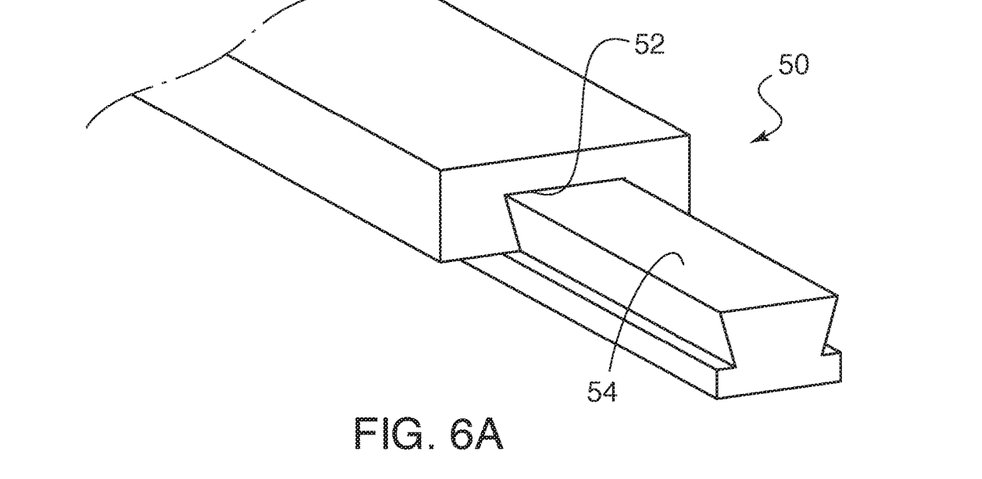
FIG. 6A is a side view of one embodiment of a translation system.
Figure 6B:
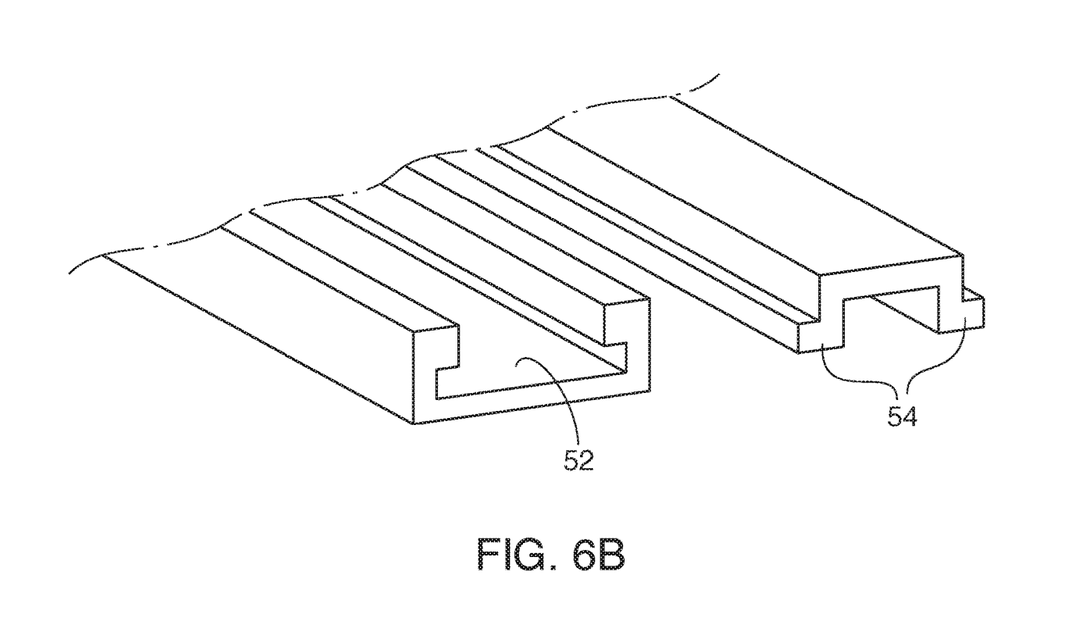
FIG. 6B is a side view of an alternate embodiment of a translation system.

A translation system 50 may be positioned along the seat shell 16 or other supporting structure of the passenger seat. The translation system 50 may work via mechanical activation or via electrical activation. For example, it may be possible for a user to manually raise and lower the second upper portion 20. In another example, it is possible for a user to be able to control movement of the second upper portion 20 via a control panel provided in a location is accessible by the seat occupant. In the example shown, the translation system 50 is defined by a track 52 and one or more track cooperating feature(s) 54 on the second upper portion 20. It is also possible however, for these features to be interchangeable, such that a track is provided on the second upper portion 20 and one or more track cooperating feature(s) 54 is provided on the seat shell 16. In one example, the track 52 may be a groove, and the track cooperating feature 54 may be a corresponding protrusion received by the groove. The cooperation may be via dove tail slot, a J-hook, a ratcheting system, a pulley, ball and detent cooperation, or any other appropriate system that allows translational movement. Exemplary translation systems are illustrated by FIGS. 6A and 6B. Other translational systems are possible for use and considered within the scope of this disclosure. Adjustment may be via a series of broad set points and/or via fine-tune adjustment with comfort options capable of being set anywhere along the translation system 50.

FIG. 3 illustrates the passenger seat 10 with the upper portion 20 in a lowered configuration. In this configuration, upper portion 20 is lower than the upper surface of the seat shell 16. The seat occupant may still use the upper surface 26 of the first lower portion 18 as an arm rest, but the space 24 between the portions 18, 20 is minimized. In FIG. 4, the upper portion 20 has been raised to be generally flush with the upper surface of the seat shell 16. In this configuration, the upper portion 20 may function as an upper back/neck rest. In FIG. 5, the upper portion 20 has been raised to a privacy level. In this configuration, the upper portion 20 may function as a headrest and/or a privacy screen. The upper portion 20 is shown as rising above the seat shell 16.

Figure 7:
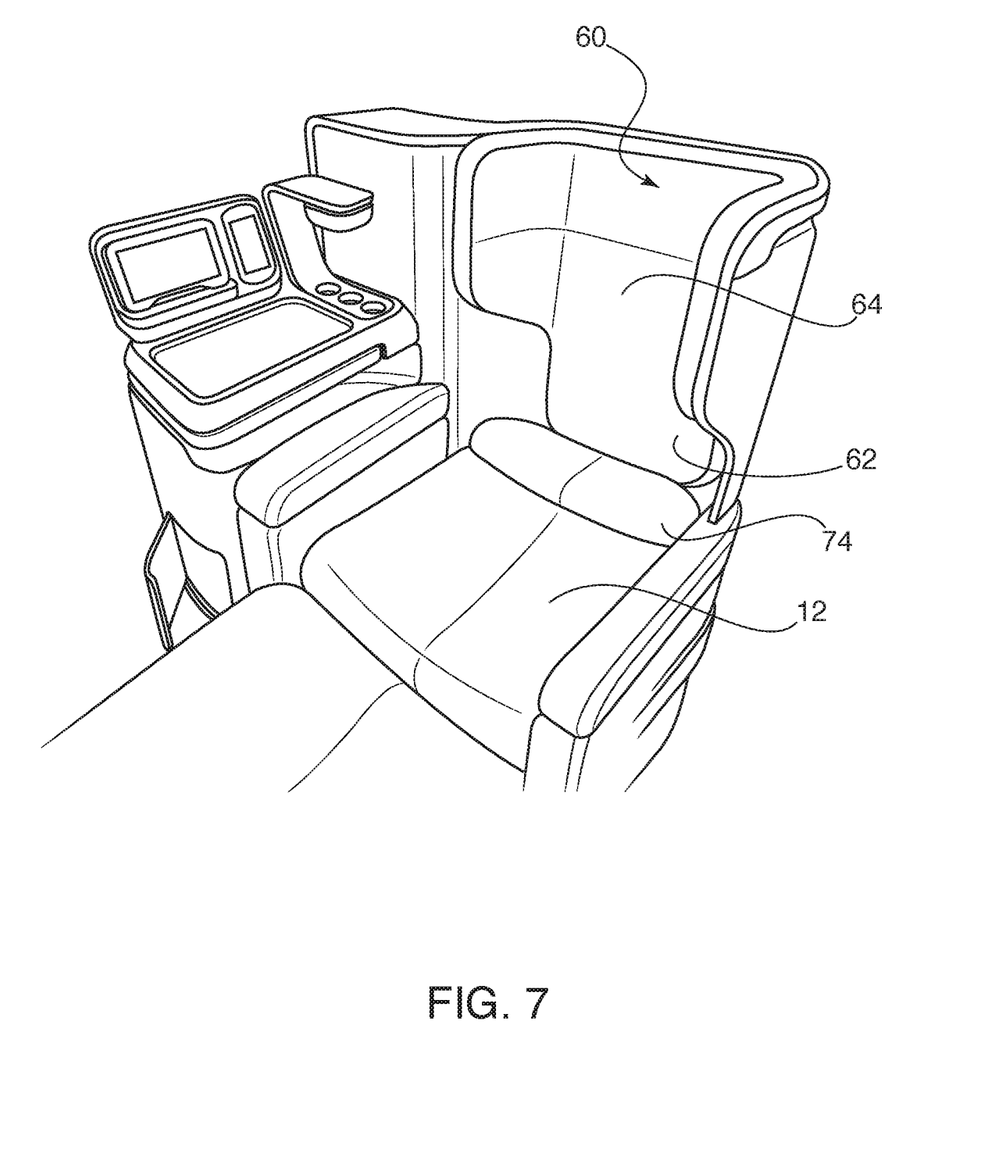
FIG. 7 is a side perspective view of an alternate passenger seat configuration.
Figure 8:
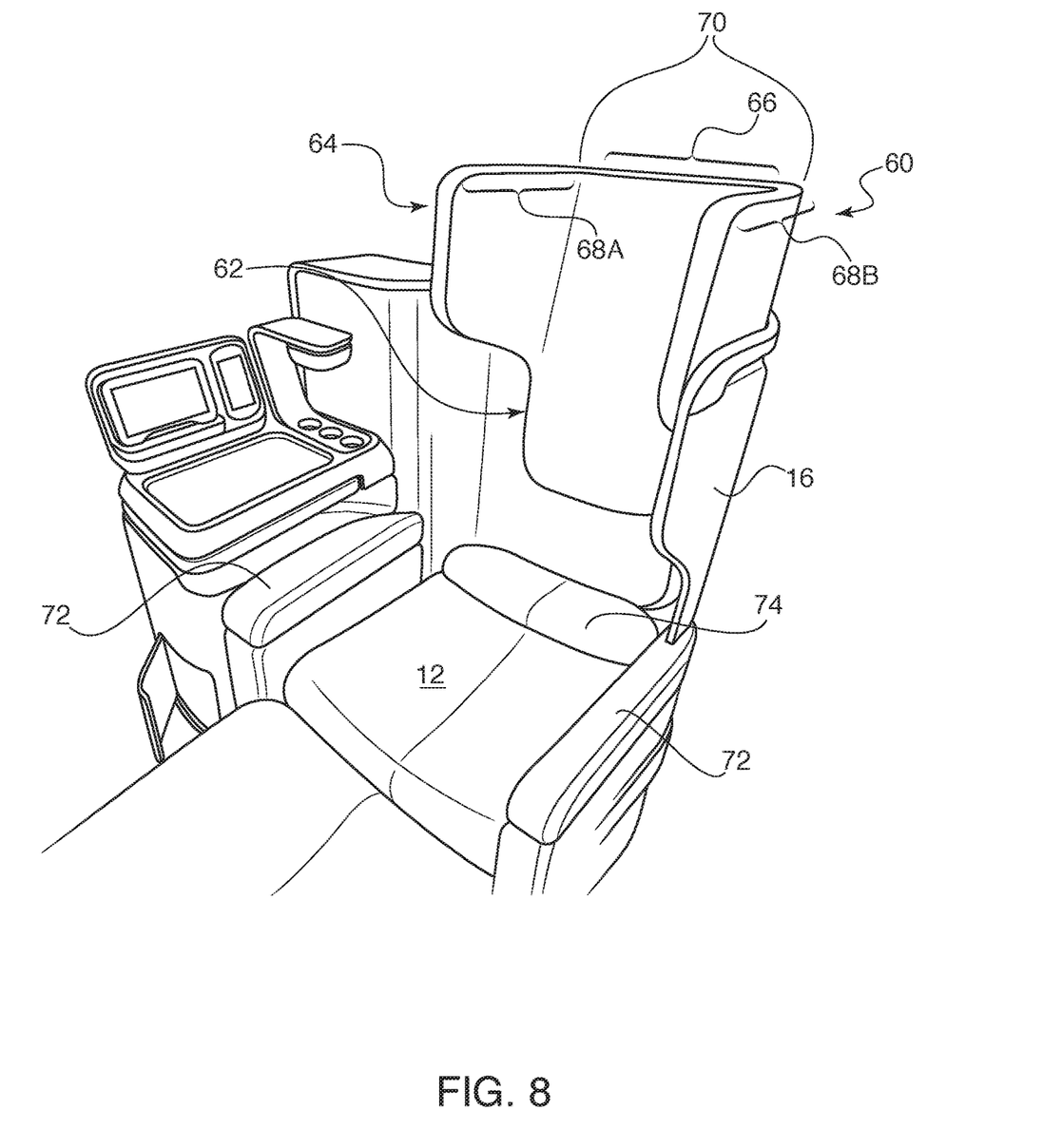
FIG. 8 is a side perspective view of the passenger seat of FIG. 7, with the backrest in a raised position.
Figure 9:
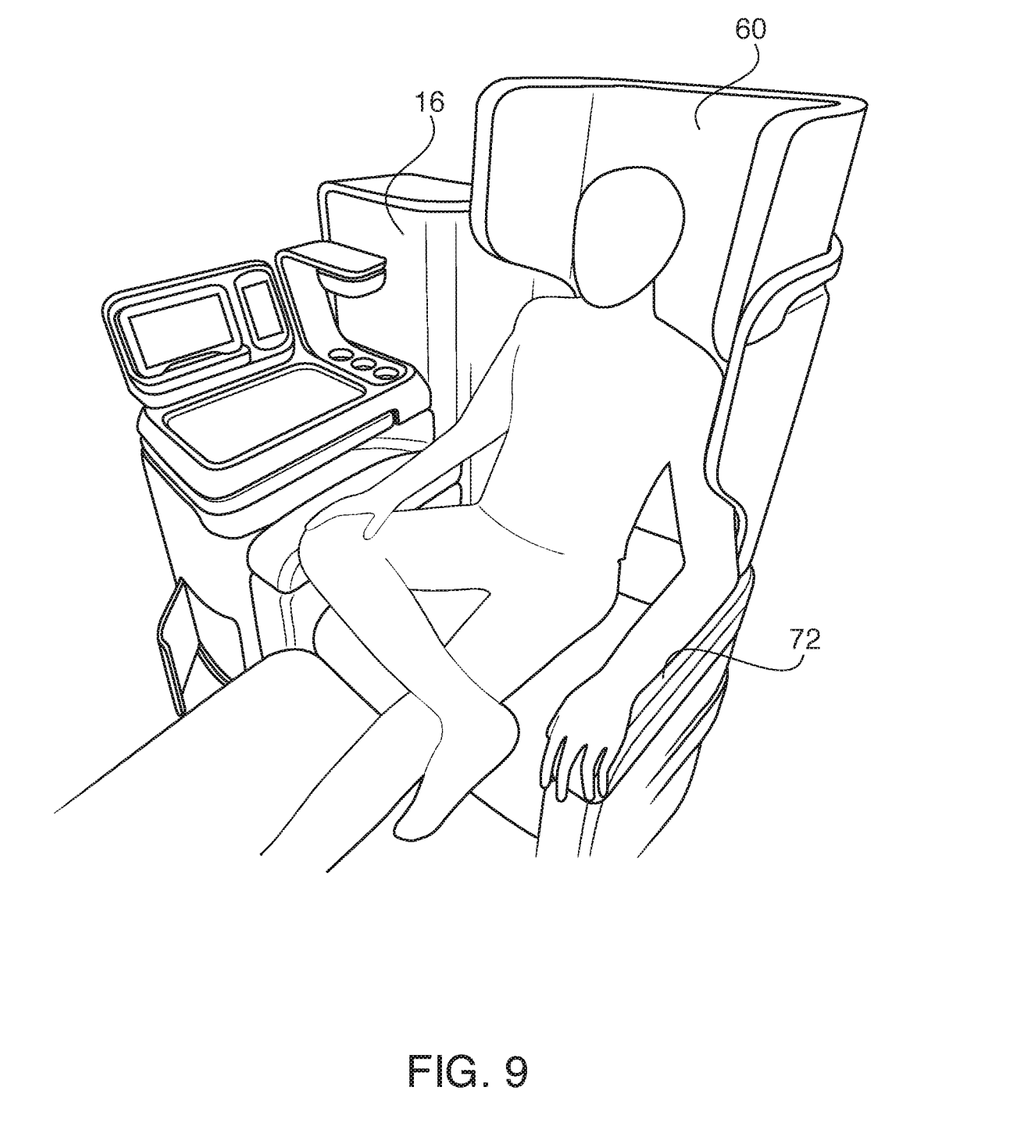
FIG. 9 is a side perspective view of FIG. 8, illustrating the positioning of a seat occupant.

FIGS. 7-9 illustrate an alternate embodiment of a backrest 60. In this example, the backrest 60 is an integrally formed, one-piece configuration. The backrest 60 is designed to be movable with respect to the seat portion 12. Any of the above-described translation systems may be used to affect movement of the backrest 60. Backrest 60 is designed as having a lower portion 62 and an upper 64. The lower portion 62 is generally a lower lumbar rest when the backrest is in its lowered position. The upper portion 64 generally forms a privacy enclosure. The upper portion 64 is illustrated as having a wider surface area than the lower portion 62. The wider surface area is defined by a back wall 66 and sidewalls 68A and 68B. The sidewalls 68A and 68B are generally positioned along shoulder height of a seat occupant when the backrest 60 is in its lowered position. Curved angles 70 define curved areas where the sidewalls 68A and 68B curved and extend away from the back wall 66. When a seat occupant desires enhanced privacy or increased comfort, the backrest 60 may be raised, as shown by FIG. 8.

As illustrated by FIG. 9, when the backrest 60 is raised, the lower portion 62 may raise closer to upper back/shoulder height, and the upper portion 64 may raise to head height. The raised configuration of backrest 60 can provide the passenger with a feeling of increased privacy within the envelope of the passenger seat. The seat shell 16 may define one or more armrests 72. The seat shell 16 may define a number of other passenger comfort features, such as a side console, video monitor, drink holders, reading lights, storage solutions, or any other accessories or desired options.

An additional optional feature of the passenger seats described herein is providing a cushioned resting area. The cushioned resting area may be defined by a traditional padded seat cushion. In another example, the cushioned resting area may be provided by one or more inflatable portions 74. If provided, the one or more inflatable portions 74 may be positioned along any portion of the backrest portion 14, 60. Examples of certain embodiments of inflatable portions 74 are shown and described by concurrently-filed application titled "Passenger Seat with Comfort Layout," PCT Serial Number PCT/US2017/062142, the entire contents of which are incorporated herein by reference. The one or more inflatable portions 74 may be variably inflatable in order to allow a passenger to have different levels of lumbar, back, or neck support. For example, it is possible to change the architecture of the seat using the one or more inflatable portions 74, which function as cushioning support. A user may wish to sit more upright or may otherwise wish to change the angle between the sitting area and the backrest by inflating or deflating an inflatable portions 74. The one or more inflatable portion 74 may function similar to a lumbar support in an automobile. An additional option that may be added is providing a heated or cooled seat via use of the portion 74. The passenger may be able to achieve different combinations of firmness via use of the one or more inflatable portion 74. Controls for the one or more inflatable portions 74 may be positioned on an armrest, on the side console, on a video screen, on an overhead panel, or anywhere else that may be appropriate or otherwise accessible by the seat occupant.

As illustrated by FIG. 8, it is also possible to provide an inflatable portion 74 at the junction at which the seat portion 12 meets the seat shell 16 (and/or the backrest 60, when it is in a lowered position). This may help provide sacrum support for a seat occupant. This may also help provide a pillow feature for the seat occupant if he/she desires to use the seat as a bed. The portion illustrated by FIG. 8 need not be inflatable; it is also understood that the portion may be provided as an optional pillow feature or an optional removable cushion feature.

In the following, further examples are described to facilitate the understanding of the invention:

Example A

One example provides a passenger seat backrest, comprising: a passenger seat privacy shell defining a seat portion and a backrest portion, the back rest portion comprising a movable portion configured to translate with respect to the privacy shell, wherein in a lowered position, the backrest is flush with or lower than the privacy shell and wherein in a raised position, the backrest extends above the privacy shell.

Example B

The component of any of the preceding or subsequent examples, wherein the backrest portion further comprises a lower portion and an upper portion, the lower portion configured to remain stationary, and the upper portion configured to translate with respect to the lower portion to create a space therebetween, wherein in a lowered position, the upper portion is flush with or lower than the privacy shell and wherein in a raised position, the upper portion extends above the privacy shell.

Example C

The component of any of the preceding or subsequent examples, wherein the lower portion comprises a lumbar cushion with side arms extending therefrom at curved side angles.

Example D

The component of any of the preceding or subsequent examples, wherein the upper portion comprises a head/neck cushion with side arms extending therefrom at curved side angles.

Example E

The component of any of the preceding or subsequent examples, wherein the backrest portion comprises a single component with an upper portion that has a wider surface area than a lower portion.

Example F

The component of any of the preceding or subsequent examples, wherein the upper portion comprises a back wall with side walls extending therefrom at curved side angles.

Example G

The component of any of the preceding or subsequent examples, further comprising one or more inflatable portions on the backrest.

Example H

The component of any of the preceding or subsequent examples, further comprising a translation system for causing translational movement of the movable portion.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat backrest, comprising:
    a passenger seat privacy shell defining a seat portion and a backrest portion, wherein the seat portion and the backrest portion are defined by the privacy shell itself so that in use, a passenger sits on the privacy shell and not a separate metal seat unit contained within a privacy shell;
    the back rest portion comprising a movable portion configured to translate with respect to the privacy shell, wherein in a lowered position, the backrest is flush with or lower than the privacy shell and wherein in a raised position, the backrest extends above the privacy shell,
    wherein the backrest portion further comprises a lower portion and an upper portion, the lower portion configured to remain stationary during use such that it does not move for any seat adjustments, and the upper portion configured to translate with respect to the stationary lower portion to create a space there between, wherein the space provides an area for a passenger's arm or elbow to be received between the upper portion and the lower portion, wherein in a lowered position, the upper portion is flush with or lower than the privacy shell and wherein in a raised position, the upper portion extends above the privacy shell.

2. The passenger seat backrest of claim 1, wherein the lower portion comprises a lumbar cushion with side arms extending therefrom at curved side angles.

3. The passenger seat backrest of claim 1, wherein the upper portion comprises a head/neck cushion with side arms extending therefrom at curved side angles.

4. The passenger seat backrest of claim 1, wherein the backrest portion comprises a single component with an upper portion that has a wider surface area than a lower portion.

5. The passenger seat backrest of claim 4, wherein the upper portion comprises a back wall with side walls extending therefrom at curved side angles.

6. The passenger seat backrest of claim 1, further comprising one or more inflatable portions on the backrest.

7. The passenger seat backrest of claim 1, further comprising a translation system for causing translational movement of the movable portion.

* * * * *